US008303873B2

(12) United States Patent
Dowe et al.

(10) Patent No.: US 8,303,873 B2
(45) Date of Patent: Nov. 6, 2012

(54) USE OF A POLYAMIDE MOLDING COMPOSITION WITH HIGH MELT STIFFNESS FOR COEXTRUSION WITH A HIGH-MELTING-POINT POLYMER

(75) Inventors: Andreas Dowe, Borken (DE); Rainer Göring, Borken (DE); Michael Böer, Olfen (DE); Roland Wursche, Dülmen (DE); Martin Himmelmann, Haltern am See (DE); Franz-Erich Baumann, Dülmen (DE); Karl Kuhmann, Dülmen (DE)

(73) Assignee: EVONIK DEGUSSA GmbH, Essen (DE)

( * ) Notice: Subject to any disclaimer, the term of this patent is extended or adjusted under 35 U.S.C. 154(b) by 802 days.

(21) Appl. No.: 11/480,459

(22) Filed: Jul. 5, 2006

(65) Prior Publication Data
US 2007/0036998 A1     Feb. 15, 2007

(30) Foreign Application Priority Data

Jul. 4, 2005 (DE) .......................... 10 2005 031 491

(51) Int. Cl.
  B32B 27/34 (2006.01)
  C08J 3/00 (2006.01)
  C08L 69/00 (2006.01)
  A61K 6/00 (2006.01)
(52) U.S. Cl. ................ 264/173.19; 264/176.1; 264/241; 264/330; 525/433; 525/420; 428/36.91; 428/474.4
(58) Field of Classification Search ............. 264/173.19, 264/173.16, 176.1, 241, 330; 525/433, 420; 428/36.9, 36.91, 474.4
See application file for complete search history.

(56) References Cited

U.S. PATENT DOCUMENTS

| | | | | |
|---|---|---|---|---|
| 3,486,196 A | * | 12/1969 | Strutzel et al. ............... | 425/72.1 |
| 3,549,724 A | * | 12/1970 | Okazaki et al. ............... | 525/430 |
| 3,946,089 A | * | 3/1976 | Furukawa et al. ............ | 525/408 |
| 4,482,695 A | * | 11/1984 | Barbee et al. ................ | 528/208 |
| 4,732,934 A | * | 3/1988 | Hathaway et al. ............ | 525/66 |
| 5,068,284 A | * | 11/1991 | Ullman et al. ............... | 525/67 |
| 5,248,720 A | * | 9/1993 | Deguchi et al. .............. | 524/444 |
| 5,405,936 A | | 4/1995 | Mumcu et al. | |
| 5,425,974 A | * | 6/1995 | von Widdern et al. ....... | 428/35.4 |
| 5,668,242 A | | 9/1997 | Simon et al. | |
| 5,716,684 A | * | 2/1998 | Stoeppelmann et al. .. | 428/36.91 |
| 5,747,560 A | * | 5/1998 | Christiani et al. ............ | 523/209 |
| 5,932,687 A | | 8/1999 | Baumann et al. | |
| 6,060,550 A | | 5/2000 | Simon et al. | |
| 6,149,836 A | | 11/2000 | Mumcu et al. | |
| 6,232,388 B1 | * | 5/2001 | Lan et al. ...................... | 524/445 |
| 6,300,413 B1 | | 10/2001 | Simon et al. | |
| 6,316,537 B1 | | 11/2001 | Baumann et al. | |
| 6,335,101 B1 | | 1/2002 | Haeger et al. | |
| 6,440,566 B1 | * | 8/2002 | Maligie et al. ................ | 428/412 |
| 6,500,554 B2 | | 12/2002 | Gahlmann et al. | |
| 6,525,099 B1 | * | 2/2003 | Arnold et al. ................. | 514/605 |
| 6,569,538 B1 | * | 5/2003 | Kaschel ...................... | 428/475.8 |
| 6,579,581 B2 | | 6/2003 | Bartz et al. | |
| 6,586,500 B2 | * | 7/2003 | Bagrodia et al. ............. | 523/209 |
| 6,589,378 B2 | * | 7/2003 | Grefenstein et al. .......... | 156/222 |
| 6,589,606 B2 | | 7/2003 | Waterkamp et al. | |
| 6,589,615 B1 | * | 7/2003 | Yen .............................. | 428/34.8 |
| 6,613,407 B1 | * | 9/2003 | Kaschel ....................... | 428/35.7 |
| 6,656,997 B2 | | 12/2003 | Baumann et al. | |
| 6,670,047 B2 | * | 12/2003 | Nanba et al. ................ | 428/474.4 |
| 6,677,015 B2 | | 1/2004 | Himmelmann et al. | |
| 6,766,091 B2 | | 7/2004 | Beuth et al. | |
| 6,784,227 B2 | | 8/2004 | Simon et al. | |
| 6,803,113 B2 | * | 10/2004 | Porter et al. ................ | 428/474.4 |
| 6,855,787 B2 | * | 2/2005 | Funaki et al. ................ | 526/250 |
| 6,884,485 B2 | | 4/2005 | Baumann et al. | |
| 7,005,481 B1 | * | 2/2006 | Lehmann et al. ............. | 525/433 |
| 7,025,842 B2 | | 4/2006 | Monsheimer et al. | |
| 7,060,347 B2 | | 6/2006 | Monsheimer et al. | |
| 7,534,494 B2 | * | 5/2009 | Wakita et al. ............... | 428/423.5 |
| 7,619,037 B2 | * | 11/2009 | Higuchi et al. ................ | 525/88 |
| 7,786,189 B2 | * | 8/2010 | Maruo et al. ................. | 523/216 |
| 7,833,450 B2 | * | 11/2010 | Montanari et al. ....... | 264/211.12 |
| 2001/0033924 A1 | * | 10/2001 | Qian et al. ................ | 428/297.1 |
| 2003/0114636 A1 | | 6/2003 | Schiffer et al. | |
| 2003/0124281 A1 | | 7/2003 | Ries et al. | |
| 2003/0225201 A1 | * | 12/2003 | Yamana et al. ............... | 524/589 |
| 2004/0097636 A1 | | 5/2004 | Baumann et al. | |
| 2004/0102539 A1 | | 5/2004 | Monsheimer et al. | |

(Continued)

FOREIGN PATENT DOCUMENTS

GB    1 283 101 A1    2/2003

(Continued)

OTHER PUBLICATIONS

Wikipedia encyclopedia: http://en.wikipedia.org/wiki/nylon 6-6 and http://en.wikipedia.org/wiki/Nylon.*

(Continued)

*Primary Examiner* — Joseph Del Sole
*Assistant Examiner* — Nahida Sultana
(74) *Attorney, Agent, or Firm* — Oblon, Spivak, McClelland, Maier & Neustadt, L.L.P.

(57) ABSTRACT

Multilayer composites are obtained from a molding composition which contains the following components:
  a) 100 parts by weight of polyamide and
  b) from 0.005 to 10 parts by weight of a compound having at least two carbonate units by coextruding with a molding composition based on a high-melting-point polymer whose crystallite melting point $T_m$ is at least 255° C. and/or whose glass transition temperature $T_g$ is at least 180° C.

14 Claims, No Drawings

U.S. PATENT DOCUMENTS

| | | | |
|---|---|---|---|
| 2004/0106691 A1 | 6/2004 | Monsheimer et al. | |
| 2004/0137228 A1 | 7/2004 | Monsheimer et al. | |
| 2004/0138363 A1 | 7/2004 | Baumann et al. | |
| 2004/0140668 A1 | 7/2004 | Monsheimer et al. | |
| 2004/0180980 A1 | 9/2004 | Petter et al. | |
| 2004/0204531 A1 | 10/2004 | Baumann et al. | |
| 2004/0209021 A1* | 10/2004 | Shih | 428/34.2 |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2005/0137288 A1* | 6/2005 | Maruo et al. | 523/216 |
| 2005/0271887 A1* | 12/2005 | Ulrich et al. | 428/474.4 |
| 2005/0282025 A1* | 12/2005 | Brown | 428/474.4 |
| 2006/0071359 A1 | 4/2006 | Monsheimer et al. | |
| 2006/0134419 A1 | 6/2006 | Monsheimer et al. | |
| 2006/0251876 A1* | 11/2006 | Goerlitz et al. | 428/220 |
| 2006/0281873 A1* | 12/2006 | Alting et al. | 525/432 |
| 2007/0049680 A1* | 3/2007 | Maruo et al. | 524/445 |
| 2007/0128442 A1* | 6/2007 | Buehler | 428/411.1 |
| 2007/0134411 A1* | 6/2007 | Cont et al. | 427/213.34 |
| 2007/0167552 A1* | 7/2007 | Stoeppelmann et al. | 524/445 |
| 2008/0095960 A1* | 4/2008 | Schell et al. | 428/34.8 |
| 2008/0274245 A1* | 11/2008 | Lee et al. | 426/394 |
| 2009/0117399 A1* | 5/2009 | Frecka | 428/474.7 |
| 2010/0108778 A1* | 5/2010 | Greenland | 239/56 |
| 2010/0130692 A1* | 5/2010 | Cham et al. | 525/240 |
| 2010/0151180 A1* | 6/2010 | Bravet et al. | 428/76 |
| 2010/0151193 A1* | 6/2010 | Komatsu et al. | 428/141 |

FOREIGN PATENT DOCUMENTS

| | | |
|---|---|---|
| GB | 1 512 710 A2 | 3/2005 |
| JP | 2002-18999 | 1/2002 |
| JP | 2005-60705 | 3/2005 |
| JP | 2005-119017 | 5/2005 |

OTHER PUBLICATIONS

Nylon 12, Microspec corportation Advanced Medical Extrusions: www.microspecorporation.com/materials.php?id=16.*
U.S. Appl. No. 11/335,587, filed Jan. 20, 2006, Monsheimer, et al.
U.S. Appl. No. 11/354,114, filed Feb. 15, 2006, Dowe, et al.
U.S. Appl. No. 11/354,100, filed Feb. 15, 2006, Dowe, et al.
U.S. Appl. No. 11/484,593, filed Jul. 12, 2006, Monsheimer, et al.
U.S. Appl. No. 11/816,595, filed Aug. 17, 2007, Haeger, et al.
U.S. Appl. No. 11/816,588, filed Aug. 17, 2007, Haeger, et al.
U.S. Appl. No. 12/374,832, filed Jan. 23, 2009, Dowe, et al.
U.S. Appl. No. 12/675,122, filed Feb. 25, 2010, Dowe, et al.
U.S. Appl. No. 12/676,752, filed Mar. 5, 2010, Dowe, et al.
U.S. Appl. No. 13/063,134, filed Mar. 9, 2011, Dowe, et al.
U.S. Appl. No. 13/128,297, filed May 9, 2011, Dowe, et al.
U.S. Appl. No. 13/202,338, filed Aug. 19, 2011, Dowe, et al.

* cited by examiner

USE OF A POLYAMIDE MOLDING COMPOSITION WITH HIGH MELT STIFFNESS FOR COEXTRUSION WITH A HIGH-MELTING-POINT POLYMER

BACKGROUND OF THE INVENTION

1. Field of the Invention

The present invention relates to the use of a polyamide molding composition with high melt stiffness for coextrusion with a molding composition based on a high-melting-point polymer. The invention also relates to a process that includes coextruding a multilayer composite from a polyamide molding composition with high melt stiffness and from a molding composition based on a high-melting-point polymer, and also relates to the multilayer composites produced by the process.

2. Description of the Related Art

For the purposes of this invention, high-melting-point polymers (also known as HT polymers) are polymers which can be processed only at high temperatures. If the material is a semicrystalline polymer, the crystallite melting point $T_m$, measured by means of DSC according to ISO 11357, is at least 255° C. In the case of an amorphous polymer, the glass transition temperature $T_g$, likewise measured by DSC according to ISO 11 357, is at least 180° C. Extrusion of both types of polymer at a speed sufficient for cost-effectiveness is possible only at temperatures around 300° C. or greater.

When polyamides, such as PA12, are coextruded with HT polymers of this type, various difficulties can arise due to the high extrusion temperatures and to the attendant markedly reduced stiffness of the polyamide melt. An excessive difference in melt viscosities leads to instabilities of the layer boundaries, to poor layer thickness distributions and poor wall thickness distributions, and to unsatisfactory overall quality of the extrudate.

For this reason, attempts to coextrude HT polymers such as ETFE (crystallite melting point $T_m$ about 270° C.; processing temperature from 300 to 340° C.) have focused on reducing the melting point of the HT polymer in order to achieve coextrudability with lower-melting-point polymers, such as PA12. An example of a result of these attempts is provided by soft ETFE (e.g. Neoflon RP7000 from Daikin, Japan) whose crystallite melting point is about 255° C. and whose recommended processing temperature is from 280 to 290° C., or the EFEP type of polymer (e.g. Neoflon RP5000 from Daikin), whose crystallite melting point is about 195° C. and whose processing temperature is from about 240 to 285° C. Within that processing latitude, the stiffness of a melt of an extrusion molding composition based on PA12 is sufficient to achieve coextrudability with soft ETFE and, respectively, EFEP, to give sufficient quality. However, when ETFE is modified performance is impaired, for example reduced barrier action with respect to fuels.

U.S. Pat. No. 7,005,481 discloses a polyamide molding composition and describes the use of compounds having at least two carbonate units for modification of polyamides by condensation, permitting reliable and stable establishment of properties and providing the possibility of undertaking repeated processing of the material modified by condensation, without resultant gelling or inhomogeneity. Brüggemann KG markets the product Brüggolen M1251, which is an additive based on this principle for molecular weight adjustment of polyamides. Main applications are in the viscosity adjustment sector for recycled material composed of PA6 or PA66, this material being recycled in molding compositions for extrusion. The additive Brüggolen M1251 is a masterbatch of a low-viscosity polycarbonate, such as Lexan 141, in an acid-terminated PA6. A reaction between the polycarbonate and the amino end groups present in the material to be modified by condensation is the cause of the increase in molecular weight.

Studies have shown that it is also difficult to achieve coextrusion with other high-melting-point polymers, e.g. PPS, for the same reasons described above.

SUMMARY OF THE INVENTION

One object of the invention is to eliminate the abovementioned disadvantages.

Another object of the invention is to provide a process for coextruding a multilayer composite from a polyamide molding composition with high melt stiffness.

Another object of the invention is to provide a process for coextruding a multilayer composite from a molding composition based on a high-melting-point polymer.

Another object of the invention is to provide a multilayer composites.

Another object of the invention is the use of a molding composition which comprises the following components:
 a) 100 parts by weight of polyamide and
 b) from 0.005 to 10 parts by weight of a compound having at least two carbonate units for coextrusion with a molding composition based on a high-melting-point polymer whose crystallite melting point $T_m$ is at least 255° C. and/or whose glass transition temperature $T_g$ is at least 180° C.

DETAILED DESCRIPTION OF THE INVENTION

A polyamide suitable for the purposes of the invention includes polymerized monomer units of any of lactams, aminocarboxylic acids, or diamines, and dicarboxylic acids. The polyamide can moreover contain monomer units which have a branching effect and which have been derived from, e.g., tricarboxylic acids, triamines, and/or polyethyleneimine. Examples of suitable types, in each case in the form of homopolymer or in the form of copolymer are PA6, PA66, PA610, PA66/6, and particularly PA612, PAb010, PA1012, PA1212, PA613, PA614, PA1014, PA11, PA12 or a transparent polyamide. Examples of transparent polyamides that can be used are:

polyamides containing polymerized units of terephthalic acid and an isomer mixture including 2,2,4- and 2,4,4-trimethylhexamethylenediamine, polyamides containing polymerized units of isophthalic acid and 1,6-hexamethylenediamine, copolyamides containing polymerized units of a mixture including terephthalic acid/isophthalic acid and 1,6-hexamethylenediamine, copolyamides containing polymerized units of isophthalic acid, 3,3'-dimethyl-4,4' diaminodicyclohexylmethane and laurolactam or caprolactam, (co)polyamides containing polymerized units of 1,12-dodecanedioic acid, 3,3'-dimethyl-4,4'-diaminodicyclohexylmethane and, if desired, laurolactam or caprolactam, copolyamides containing polymerized units of isophthalic acid, 4,4'-diaminodicyclohexylmethane and laurolactam or caprolactam, polyamides containing polymerized units of 1,12-dodecanedioic acid and 4,4' diaminodicyclohexylmethane, copolyamides containing polymerized units of a terephthalic acid/isophthalic acid mixture, 3,3'-dimethyl-4,4'-diaminodicyclohexylmethane and laurolactam.

Other suitable materials are polyetheramides based on lactams, aminocarboxylic acids, diamines, dicarboxylic acids, polyetherdiamines, and/or polyetherdiols.

The number average molecular weights $M_n$ of the starting compounds are preferably greater than 5000, in particular greater than 8000. Polyamides may include those whose end groups at least to some extent take the form of amino groups. By way of example, at least 30%, at least 40%, at least 50%, at least 60%, at least 70%, at least 80%, or at least 90% of the end groups take the form of amino end groups. Preparation of polyamides with relatively high amino end group content, using diamines or polyamines as regulator is known. In the present case, when preparing the polyamide it is preferable to use an aliphatic, cycloaliphatic, or araliphatic diamine having from 4 to 44 carbon atoms as regulator. Examples of suitable diamines are hexamethylenediamine, decamethylenediamine, 2,2,4- or 2,4,4-trimethylhexamethylenediamine, dodecamethylenediamine, 1,4-diaminocyclohexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexylpropane, isophoronedi amine, metaxylylenediaamine, or paraxylylenediamine.

In another preferred embodiment, a polyamine regulator being a branching agent is used when the polyamide is prepared. Examples here are diethylenetriamine, 1,5-diamino-3-(β-aminoethyl)pentane, tris(2-aminoethyl)amine, N,N-bis(2-aminoethyl)-N',N'-bis[2-[bis(2-aminoethyl)amino]ethyl]-1,2-ethanediamine, dendrimers, and also polyethyleneimines, particularly branched polyethyleneimines obtainable via polymerization of aziridines (Houben-Weyl, Methoden der Organischen Chemie [Methods of organic chemistry], Volume E20, pages 1482-1487, Georg Thieme Verlag Stuttgart, Germany, 1987, incorporated herein by reference) and which generally have the following amino group distribution:

from 25 to 46% of primary amino groups,
from 30 to 45% of secondary amino groups, and
from 16 to 40% of tertiary amino groups.

In a preferred embodiment of the inventive process, at least one compound having at least two carbonate units is used in a quantitative proportion of from 0.005 to 10% by weight, calculated in relation to the polyamide used. This ratio is preferably in the range from 0.01 to 5.0% by weight, particularly preferably in the range from 0.05 to 3% by weight. The term "carbonate" here means an ester of carbonic acid, in particular with phenols or with alcohols.

The compound having at least two carbonate units can be a low-molecular-weight, oligomeric, or polymeric compound. It can be composed entirely of carbonate units, or can have other units as well. Other units are preferably oligo- or polyamide, -ester, -ether, -etheresteramide, or -etheramide units. These compounds can be prepared via known oligo- or polymerization processes and via polymer-analogous reactions.

In one preferred embodiment, the compound having at least two carbonate units is a polycarbonate, for example based on bisphenol A, or a block copolymer that contains a polycarbonate block based on bisphenol A.

U.S. Pat. No. 7,005,481, which is expressly incorporated herein by reference in its entirety, gives a detailed description of suitable compounds having at least two carbonate units, and also of suitable masterbatches.

If the compound having at least two carbonate units is used as an additive and is fed in the form of a masterbatch, more precise metering of the additive can be achieved because the amounts of masterbatch used are relatively large. It has moreover been found that use of a masterbatch achieves improved extrudate quality. The masterbatch preferably includes as matrix material the polyamide which is also modified by condensation in a process of the invention, or a polyamide compatible therewith. In another embodiment of the invention incompatible polyamides undergo partial linkage to the polyamide and are thereby compatibilized and can be used in the matrix. The molecular weight $M_n$ of the polyamide used as matrix material in the masterbatch is preferably greater than 5000 and particularly greater than 8000. Preference is given to polyamides having mainly carboxylic acid end groups. By way of example, at least 80%, at least 90%, or at least 95% of the end groups may have acid groups.

The concentration of the compound having at least two carbonate units in the masterbatch is preferably from 0.15 to 50% by weight, particularly preferably from 0.2 to 25% by weight, and with particular preference from 0.3 to 15% by weight. This masterbatch is prepared in the conventional manner known to the person skilled in the art.

In a preferred embodiment, the invention can be used with polyamides which as a result of their preparation comprise at least 5 ppm of phosphorus in the form of an acidic compound. In this case, prior to or during the compounding process from 0.001 to 10% by weight, based on the polyamide, of a salt of a weak acid is added to the polyamide molding composition. U.S. 2005/038201 discloses suitable salts, and is incorporated herein by reference in its entirety.

In other embodiments of the invention, polyamides having less than 5 ppm of phosphorus or no phosphorus at all in the form of an acidic compound may be used. In this case, it is possible but not essential to add an appropriate salt of a weak acid.

The use of additives used in the conventional preparation of polyamide molding compositions is included in the invention. Examples of additives include colorants, flame retardants, stabilizers, fillers, lubricants, mold-release agents, impact modifiers, plasticizers, crystallization accelerators, antistatic agents, processing aids, and also other polymers which may be compounded with polyamides. Examples of additives include the following:

Colorants: titanium dioxide, white lead, zinc white, lithopones, antimony white, carbon black, iron oxide black, manganese black, cobalt black, antimony black, lead chromate, minium, zinc yellow, zinc green, cadmium red, cobalt blue, Prussian blue, ultramarine, manganese violet, cadmium yellow, Schweinfurter green, molybdate orange, molybdate red, chrome orange, chrome red, iron oxide red, chromium oxide green, strontium yellow, molybdenum blue, chalk, ocher, umbra, green earth, burnt sienna, graphite, or soluble organic dyes.

Flame retardants: antimony trioxide, hexabromocyclododecane, tetrachloro- or tetrabromobisphenol, halogenated phosphates, borates, chloroparaffins, and also red phosphorus, and stannates, melamine cyanurate and its condensates, such as melam, melem, melon, melamine compounds, such as melamine pyro- and polyphosphate, ammonium polyphosphate, aluminum hydroxide, calcium hydroxide, and also organophosphorus compounds which contain no halogens, e.g. resorcinol diphenyl phosphate or phosphonic esters.

Stabilizers: metal salts, in particular copper salts and molybdenum salts, and also copper complexes, phosphites, sterically hindered phenols, secondary amines, UV absorbers, and HALS stabilizers.

Lubricants: $MoS_2$, paraffins, fatty alcohols, and also fatty acid amides.

Mold-release agents and processing aids: waxes (montanates), montanic acid waxes, montanic ester waxes, polysiloxanes, polyvinyl alcohol, $SiO_2$, calcium silicates, and also perfluoropolyethers.

Plasticizers: BBSA, POBO.

Impact modifiers: polybutadiene, EPM, EPDM, HDPE, acrylate rubber.

Antistatic agents: carbon black, carbon fibers, graphite fibrils, polyhydric alcohols, fatty acid esters, amines, amides, quaternary ammonium salts.

Other polymers: ABS, polypropylene.

The amounts that can be used of these additives are those which are conventional and known to the person skilled in the art.

The crystallite melting point $T_m$ of the high-melting-point polymer is preferably in each case at least 255° C., 260° C., 265° C., 270° C., 275° C., 280° C., 285° C., 285° C., 290° C., 295° C. or 300° C., and/or its glass transition temperature is preferably in each case at least 180° C., 185° C., 190° C., 195° C., 200° C., 205° C., 210° C., 215° C., 220° C., 225° C., 230° C., 235° C., 240° C., or 245° C. Preferably all of the high-melting point polymers present in the invention have such crystallite melting point $T_m$ and/or glass transition temperature. This amount present in the molding composition based on this polymer relative to the total weight of the composition is at least 50% by weight, at least 55% by weight, at least 60% by weight, at least 65% by weight, at least 70% by weight, at least 75% by weight, or at least 80% by weight.

Examples of Suitable High-Melting-Point Polymers Include:
- fluoropolymers, such as polytetrafluoroethylene (PTFE), tetrafluoroethylene-hexafluoropropene copolymers (FEP), or ethylene-tetrafluoroethylene copolymers (ETFE);
- polyamides and copolyamides, such as PA46, PA66, PA9T, PA12T, PA66/6T, PA6/6T, or PA6T/MPMDT (MPMD being 2-methylpentamethylenediamine);
- polyether ketones, such as PEEK, PEKK or PEK;
- liquid-crystalline polymers (LCP), such as liquid-crystalline polyesters;
- polyphenylene sulfide (PPS);
- polysulfones;
- polyether sulfones;
- polyetherimides, and
- syndiotactic polystyrene.

The layer adhesion between the polyamide molding composition and the molding composition based on the high-melting-point polymer may be achieved via use of a suitable adhesion promoter.

The molding composition containing the polyamide and the compound having at least two carbonate units may be prepared in advance and may be used in this form for the coextrusion process. In one preferred embodiment, this molding composition is prepared in situ during processing.

The invention includes a process for production of a multilayer composite that includes:
  a) providing a polyamide molding composition,
  b) preparing a premix of the polyamide molding composition and from 0.005 to 10 parts by weight of the compound having at least two carbonate units, based on 100 parts by weight of polyamide,
  c) optionally storing and/or transporting the mixture, and
  d) coextruding the mixture containing the molding composition based on the high-melting-point polymer.

Surprisingly, it has been found that with this type of addition a significant increase in melt stiffness occurs during processing, while at the same time processing pressures are moderate and load on the motor is low. Despite high melt viscosity, high throughputs can be achieved in processing, with a resultant improvement in the cost-effectiveness of the production process.

In one embodiment of the process of the invention, the compound having at least two carbonate units is added undiluted or in the form of a masterbatch only after the compounding process, but at the latest during processing. When processing is carried out, it is preferable that the polyamide to be modified by condensation or the polyamide molding composition to be modified by condensation is mixed in the form of pellets with the pellets of the compound having at least two carbonate units or the appropriate masterbatch. However, it is also possible to prepare a mixture of pellets of the finished compounded polyamide molding composition with the compound having at least two carbonate units or with the masterbatch, and then to transport or store this and then to process it. A corresponding process can also be carried out with powder mixtures. A decisive factor is that the mixture is not melted until processing has begun. Thorough mixing of the melt during processing is to be recommended. However, in an equally successful method, the masterbatch can also be fed in the form of a melt stream with the aid of an auxiliary extruder into the melt of the polyamide molding composition to be processed, and can then be incorporated by thorough mixing.

The invention includes multilayer composites produced using the polyamide molding composition or the process of the invention. Examples of multilayer composites include profiles, e.g., flat profiles and hollow-chamber profiles, supply lines, e.g., service-station supply lines, vent lines, air intake pipes, tank filler necks, fuel lines, tank ventilation lines, crankcase-ventilation lines, coolant lines, brake-air lines, hydraulic lines (clutch and brake), cable ducts, cable sheathing, flat films, blown films, sheets, storage tanks, bottles, and fuel tanks. These moldings and sheathings can be produced e.g., by coextrusion including sequential coextrusion or coextrusion blow molding, for example suction blow molding, 3D blow molding, parison-insertion processes and parison-manipulation processes. It is also possible to produce the multilayer composite with the aid of a Conex process, a coextrusion process wherein the individual layers are applied to one another in a manner comparable with that in a winding process (WO 97/28949, incorporated herein by reference in its entirety).

In one advantageous embodiment, an inventive multilayer pipe can be provided with two caps, for example those described in the utility model DE 20 2004 004 753 U1, incorporated herein by reference in its entirety. Glass- or aramid-fiber-containing tapes or rovings are then wound around the pipe. This gives a lightweight, reduced-permeation storage tank for gases and liquids.

Examples of suitable layer configurations in the inventive pipe, from the outside to the inside, include the following, PA representing the polyamide molding composition of the claims, HT representing the molding composition based on a high-melting-point polymer, and AP representing adhesion promoter:

PA/HT
HT/PA
PA/AP/HT
HT/AP/PA
PA/HT/PA
HT/PA/HT
PA/AP/HT/AP/PA
PA/HT/HT (electrically conductive)
PA/HT/PA/PA (electrically conductive)

The electrical conductivity of the inner layer can be achieved as in the prior art for example by compounding an effective amount of conductive carbon black, graphite fibrils, or other conductivity additives into the respective molding composition.

The invention will be explained by way of example below. The following materials were used in the experiments:

Amine-regulated PA12 having 50 meq/kg of NH$_2$ groups and 9 meq/kg of COOH groups, $\eta_{rel}$ about 2.15.

Acid-regulated PA12 having 8 meq/kg of NH$_2$ groups and 50 meq/kg of COOH groups, $\eta_{rel}$ about 2.15.

Bruggolen® M1251, a mixture composed of a low-viscosity polycarbonate and of acid-terminated PA6.

Ceasit® PC (calcium stearate).

The compositions stated in Table 1 were prepared in a Werner & Pfleiderer ZSK 30 twin-screw extruder.

TABLE 1

Preparation of compositions for further use

|  | Compounded material A | Batch 1 | Master-batch 2 | Master-batch 3 | Master-batch 4 |
|---|---|---|---|---|---|
| Amine-regulated PA12 [% by wt.] | 60 | 99.9 | 0 | 0 | 0 |
| Acid-regulated PA12 [% by wt.] | 40 | 0 | 98.9 | 98.4 | 97.4 |
| Bruggolen M1251 [% by wt.] | 0 | 0 | 1 | 1.5 | 2.5 |
| Ceasit PC [% by wt.] | 0 | 0.1 | 0.1 | 0.1 | 0.1 |
| Throughput [kg/h] | 10 | 10 | 10 | 10 | 10 |
| Shear rate [rpm] | 250 | 250 | 250 | 250 | 250 |
| Melt temperature [° C.] | 251 | 249 | 251 | 251 | 251 |
| Melt pressure [bar] | 33 | 35 | 34 | 34 | 34 |
| Motor power rating [%] | 73 | 78 | 72 | 72 | 72 |
| $\eta_{rel}$ to DIN EN ISO 307 | 2.11 | 2.10 | 2.12 | 2.12 | 2.12 |

Comparative Example 1 and Inventive Examples 1 to 3

The stiffness of the melt of the compositions stated in Table 2 was tested at 240° C. and, respectively, 300° C., using an elongation rheometer.

Elongation rheometers can measure the extensibility of melts at constant draw-off rate or with constant or exponential acceleration of the drawn-off strand (M. H. Wagner, A. Bernat, V. Schulze, Kautschuk Gummi Kunststoffe, volume 50, No. 9/97; M. H. Wagner, V. Schulze, A. Göttfert, Polymer Engineering and Science, Mid-April 1996, Vol. 36, No. 7).

The equipment used here was a single-screw laboratory extruder from Gottfert with max. 30 rpm and with downstream draw-off apparatus. The starting materials stated in Table 2 were processed in the extruder, starting from pellets or from a pellet mixture. The emergent strand was stretched to break-off by the draw-off apparatus at various speeds, the torque needed for this purpose being measured; from this the draw-off force was calculated. The results are shown in Table 2.

It is seen that according to the invention the melt stiffness obtained at 300° C. is about the same as or indeed higher than for a conventional PA12 molding composition at the typical processing temperature of 240° C. The polyamide molding composition prepared according to the invention can therefore be used advantageously at temperatures in the region of 300° C. and above for coextrusion with high-melting point polymers.

TABLE 2

Extension rheometer measurements

|  | Comparative Example 1 | Inv. Example 1 | Inv. Example 2 | Inv. Example 3 |
|---|---|---|---|---|
| Compounded material A [% by wt.] | 100 | 0 | 0 | 0 |
| Masterbatch 1 [% by wt.] | 0 | 60 | 60 | 60 |
| Masterbatch 2 [% by wt.] | 0 | 40 | 0 | 0 |
| Masterbatch 3 [% by wt.] | 0 | 0 | 40 | 0 |
| Masterbatch 4 [% by wt.] | 0 | 0 | 0 | 40 |
| Throughput [g/min] | 12 | 12 | 12 | 12 |
| Maximum draw-off force [cN] |  |  |  |  |
| 240° C. | 4.5 | 18.5 | 29.2 | 42.1 |
| 300° C. | 2.4 | 4.1 | 5.4 | 7.4 |

The entire contents of German Application No. 102005031491.0 are incorporated herein by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for producing a multilayer composite, comprising: preparing a first molding composition that is a mixture of: (a) 100 parts by weight of at least one polyamide and (b) from 0.005 to 10 parts by weight of a compound having at least two carbonate units based on 100 parts by weight of the polyamide; and coextruding the first molding composition and a second molding composition comprising a high-melting-point polymer having a crystallite melting point Tm of at least 275° C.; wherein the at least one polyamide and the at least one compound having at least two carbonate units are not melted together until the first molding composition and the second molding composition are coextruded and wherein the first molding composition comprises one or more polyamides selected from the group consisting of PA6, PA610, PA66/6, PA612, PA1010, PA1012, PA1212, PA613, PA614, PA1014, PA11, and PA12.

2. The process according to claim 1, wherein the glass transition temperature $T_g$ of the high-melting-point polymer is at least 190° C.

3. The process according to claim 1, wherein the crystallite melting point $T_m$, of the high-melting-point polymer is at least 275° C. and the glass transition temperature $T_g$ of the high-melting-point polymer is at least 190° C.

4. The process according to claim 1, wherein the compound having at least two carbonate units is used in the form of a masterbatch.

5. The process according to claim 1, wherein the polyamide of the first molding composition is obtained by carrying out a polymerization in the presence of a diamine or polyamine regulator.

6. The process according to claim 1, wherein the polyamide of the first molding composition comprises a transparent polyamide containing polymerized units of at least one mixture selected from the group consisting of terephthalic acid and an isomer mixture including 2,2,4- and 2,4,4-trimethyl-hexamethylenediamine; isophthalic acid and 1,6-hexamethylenediamine; terephthalic acid, isophthalic acid and 1,6- hexamethylenediamine; isophthalic acid, 3,3'-dimethyl-4,4'-diaminodicyclohexylmethane, and laurolactam; isophthalic acid, 3,3'-dimethyl-4,4'-diamino-dicyclohexylmethane and caprolactam; 1,12-dodecanedioic acid, 3,3'-dimethyl-4,4'-diaminodicyclohexylmethane; isophthalic acid, 4,4'-diaminodicyclohexylmethane and laurolactam; isophthalic acid, 4,4'-diaminodicyclohexylmethane and caprolactam; 1,12-dodecanedioic acid and 4,4'-diaminodicyclohexylmethane; and terephthalic acid, isophthalic acid, 3,3'-dimethyl-4,4'-diaminodicyclohexylmethane and laurolactam.

7. The process according to claim 1, wherein the first molding composition comprises from 0.01 to 5.0% by weight of the compound having at least two carbonate units.

8. The process according to claim 1, wherein the first molding composition comprises from 0.05 to 3% by weight of the compound having at least two carbonate units.

9. The process according to claim 1, wherein the compound having at least two carbonate units is an ester of a carbonic acid.

10. The process according to claim 1, wherein the compound having at least two carbonate units is at least one of a phenolic ester of a carbonic acid and an alcoholic ester of a carbonic acid.

11. The process according to claim 1, wherein the compound having at least two carbonate units is at least one of a polycarbonate based on bisphenol A and a block copolymer containing a block of polymerized bisphenol A units.

12. The process according to claim 1, wherein the compound having at least two carbonate units is in the form of a masterbatch comprising from 0.15 to 50% by weight of the compound having at least two carbonate units and a polyamide matrix material.

13. The process according to claim 1, wherein the high-melting-point polymer is at least one selected from the group consisting of a fluoropolymer, a polyamide, a copolyamide, a polyether ketone, a liquid-crystalline polymer, a polyphenylene sulfide, a polysulfone, a polyethersulfone, a polyetherimide, and a syndiotactic polystyrene.

14. The process according to claim 1, further comprising:
at least one of storing and transporting the first molding composition before coextruding with the second molding composition.

* * * * *